United States Patent Office 3,325,458
Patented June 13, 1967

3,325,458
ACRYLONITRILE INTERPOLYMERS
Chung Sul Kim, Bellingham, Wash., and Linda M. Wick, Warrensville Heights, Ohio, assignors to The Standard Oil Company, Cleveland, Ohio, a corporation of Ohio
No Drawing. Filed Nov. 29, 1965, Ser. No. 510,371
6 Claims. (Cl. 260—80.5)

This is a continuation-in-part application of our copending U.S. patent application Ser. No. 273,840, filed Apr. 18, 1963 and now abandoned.

This invention relates to novel interpolymers of an alpha, beta-olefinically unsaturated nitrile, a 2-alkyl-1-olefin and a lower acrylic ester and more particularly pertains to novel resinous interpolymers having excellent heat distortion temperatures and thermal stability as well as excellent uniformity, homogeneity and clarity, composed of an alpha, beta-olefinically unsaturated mononitrile having from 3 to 5 carbon atoms, a 2-alkyl-1-olefin hydrocarbon having from 6 to 12 carbon atoms and a lower alkyl acrylic ester containing from 4 to 6 carbon atoms.

The copolymerization of an alpha, beta-olefinically unsaturated nitrile, such as acrylonitrile, with a 2-methyl-1-olefin is disclosed in U.S. Patents Nos. 2,621,170 and 2,749,330. The interpolymerization of acrylonitrile, isobutylene and methylene methacrylate is described in U.S. Patent No. 2,537,626. However, there is believed to be no prior disclosure of the particular three component interpolymers embodied herein.

The present invention is concerned with the resinous interpolymers resulting from the interpolymerization of three monomers exemplified by the preferred acrylonitrile, alpha-diisobutene (2,4,4-trimethyl pentene-1) and methyl acrylate.

Other alpha, beta-olefinically unsaturated mononitriles which are useful in the present invention include methacrylonitrile, ethacrylonitrile, alpha-chloroacrylonitrile, crotonic nitrile and the like.

Other 2-alkyl-1-olefin hydrocarbons which are useful in the present invention include 2-methyl pentene-1, 2-methyl hexene-1, alpha-triisobutene and the like.

Other lower alkyl esters of acrylic acid which are useful in the present invention include ethyl acrylate and propyl acrylate and the like.

Preferred in the present invention are the resinous interpolymers resulting from the interpolymerization of from 45 to 70% by weight of the alpha, beta-olefinically unsaturated nitrile, from 20 to 40% by weight of the 2-alkyl-1-olefinic hydrocarbon and from 5 to 25% by weight of the lower alkyl acrylic ester. In the foregoing preferred ranges of monomers it is to be understood that in any given interpolymerization reaction the sum of the weight percentages of the three monomers will always be 100% by weight.

The primary technical advantage of the present invention is concerned with the surprising discovery that the incorporation of a 2-alkyl-1-olefinic hydrocarbon as a third comonomer into the known polymerizable mixture of alpha, beta-olefinically unsaturated nitrile and lower alkyl acrylic ester results in polymeric products having essentially similar flexural strengths but significantly higher heat distortion temperatures and excellent uniformity, homogeneity and clarity in the consolidated or molded form. This improvement in heat distortion temperature changes, for instance, the unsatisfactory acrylonitrile-methyl acrylate copolymer resin to a very satisfactory acrylonitrile-alpha-diisobutene-methyl acrylate terpolymer molding resin.

There are, in addition to the foregoing, other technical and economic advantages associated with the compositions of this invention. One of the prominent drawbacks of many acrylonitrile polymers has been their pronounced tendency to discolor at elevated temperatures. The causal basis of this deficiency is ascribed to the formation of conjugated carbon-nitrogen chains by the interaction of the pendant nitrile groups on the acrylonitrile polymer. One method suggested for controlling this deficiency is to modify the polymer by incorporating another monomer, possibly an unreactive monomer, into the polymer so that the interaction of neighboring pendant nitrile groups is suppressed or stopped entirely. Hydrocarbon olefins might do this, but the usual hydrocarbon monomers such as ethylene, propylene and isobutylene show little or no tendency to copolymerize uniformly with acrylonitrile. It is disclosed in U.S. Patent No. 2,537,146, for instance, that it is preferred in the copolymerization of isobutylene with acrylonitrile in order to get appreciable amounts of isobutylene into the polymer to employ isobutylene in preponderant amounts, say, in the ratio of two and a half parts or more to one part of acrylonitrile. It is indeed unexpected that 2-alkyl-1-olefinic hydrocarbons such as 2,4,4-trimethyl pentene-1 interpolymerize readily with acrylonitrile and a lower alkyl acrylic ester with the resultant improvement in thermal properties as well as a decided improvement in the transparency in the consolidated or molded form.

A concurrent economic advantage displayed by the compositions of this invention arises from the fact that the hydrocarbon olefins are cheaper than most other monomers and their utilization reduces the materials cost of the resultant polymeric resin. In the case of the use of a higher molecular weight olefin, such as alpha-diisobutene, an additional economic benefit arises. Because the molar reactivity ratios of monomers are dependent primarily upon their functional groups and not upon their molecular weights, a proportionately greater mass fraction of the final polymeric resin is derived from the hydrocarbon monomer when higher molecular weight olefins are used.

An economic advantage is also connected to the particular higher olefin, alpha-diisobutene, which is preferred in this invention. One of the reasons why the higher mono-olefins have not been used more extensively as comonomers is the difficulty in purification, particularly for the higher molecular weight mono-olefins. Hydrocarbon olefins such as alpha-diisobutene are easily and economically prepared. Alpha-diisobutene, for instance, is conveniently prepared by the acid catalyzed dimerization of isobutene. Although a mixture of alpha-diisobutene (2,4,4-trimethyl pentene-1) and beta-diisobutene (2,4,4-trimethyl pentene-2) is formed in the dimerization of isobutene, the alpha-diisobutene constitutes about 80% of the product, and beta-diisobutene is completely unreactive in the present copolymerization reaction. Thus the commercial mixture may be utilized directly in the instant process without any further purification step which necessarily would add to the cost of the monomer. The diisobutene mixture is very inexpensive and readily available.

The interpolymers of this invention can be prepared by bulk, solution or emulsion polymerization techniques although bulk and emulsion polymerizations are preferred and emulsion polymerization is most preferred.

As medium for the emulsion polymerizations of this invention there may be employed water with or without emulsifying agents. Suitable emulsifying agents include organic alkali metal sulfates and sulfonates such as the higher fatty sulfates and sulfonates; higher fatty esters, amides and ethers of groups bearing sulfate and sulfonic groups; aromatic and alkylated aromatic sulfonates, and the like. There also may be employed the fatty acid alkali metal soaps; metal salts of organic phosphate esters; cationic surface active agents such as the fatty amines and amido-amines; and non-ionic surface active agents such as the condensed glycols and polyvinyl alcohol. When it is desired to employ an emulsifier in the instant polymerization process, the aqueous media may contain upwards of about 0.5% and preferably from 1 to 3% of the emulsifier or emulsifiers, depending upon the effectiveness of the specific emulsifying agents used, and also upon the desired state of the final product; thus, if it is desired that the final product shall be a stable latex, more emulsifier will be employed than if a granular or lumpy product is acceptable.

In general, a sufficient amount of the aqueous medium is employed to provide a conveniently workable polymerization mass, this quantity being upwards of 75%, and preferably about 100%, based on the weight of monomers, 200% or more may be employed, but will usually be found unnecessary and wasteful of space in the reaction equipment.

Any of the usual free radical initiators may be incorporated into the polymerization mass to promote the reaction, such catalysts being exemplified by, but not limited to, hydrogen peroxide, per-salts, such as potassium persulfate, sodium persulfate, ammonium persulfate, organic acid peroxides such as benzoyl peroxide and peracetic acid, azo initiators, such as azodiisobutyronitrile and similar materials more fully disclosed in U.S. Patent No. 2,471,959; and other similar catalysts including the so-called redox catalysts such as a combination of an oxygen-yielding substance and a reducing agent exemplified by potassium persulfate and sodium bisulfite and similar combinations such as the types disclosed in U.S. Patent No. 2,486,241 and British Patent No. 586,881 and others well known to those skilled in the art. The amount of catalysts used may vary from about 0.1 to 5% by weight based on the weight of monomers, the greater quantities resulting in higher yields in any given time, at the expense of some reduction in average molecular weight of the product.

The interpolymerizations of this invention are preferably conducted in the substantial absence of molecular oxygen and they may be carried out at temperatures varying from about 30° C. to about 80° C. or higher. At the lower temperatures, the reaction generally proceeds more slowly with the formation of higher molecular weight polymers and conversely, at higher temperatures the reaction proceeds rapidly with the formation of polymers of somewhat lower molecular weight. A good balance between economy of operation and quality of product will be found in the preferred range of from about 40 to 70° C. Under these conditions the reaction will proceed substantially to its maximum conversion (usually 70% or more) in approximately 8 to 16 hours. The unreacted monomers then remaining may be suitably recovered and recycled.

The polymerization process of this invention may be carried out in various types of apparatus. The polymerization may be carried out at atmospheric, subatmospheric or superatmospheric pressures. For the production of small lots of resin, the ingredients may be sealed up in a bomb or other suitable vessel, and mounted in an appropriate tumbling or shaking apparatus. Large scale preparations are preferably carried out in stationary autoclaves provided with suitable rotary agitating means in the interior thereof.

The interpolymers of this invention are highly suitable for the manufacture of films, fibers and are particularly useful as molding resins in the manufacture of transparent articles.

The compositions and processes of this invention are further illustrated in the following examples wherein the amounts of ingredients are expressed as parts by weight unless otherwise indicated.

*Example I*

Experimental samples of compositions falling within the scope of this invention and the properties of the resulting plastic polymers are shown in Table I. The 70/30 copolymer of acrylonitrile and methyl acrylate is included in Table I for comparative purposes.

As will be noted in the table, the compositions of this invention can be prepared either in bulk or emulsion polymerization. Experimentally, both the bulk and emulsion polymerizations were run overnight in sealed eight ounce bottles in a nitrogen atmosphere at 60° C.

In the case of bulk polymerization, the products were recovered by precipitation from dimethyl formamide or methyl ethyl ketone, in which they were swollen and partially dissolved. The amount of acrylonitrile in the polymeric products was determined by nitrogen analysis, and the presence of each of the monomers in the polymers was established by infrared analysis.

Each of the polymers was dried in a vacuum oven overnight and was compression molded at 150° C. and 4000 p.s.i. The mechanical properties were determined on unannealed bars.

In the following table AN designates acrylonitrile, DiB designates alpha-diisobutene, MA designates methyl acrylate, AIBN designates azobisisobutyronitrile, t-DM designates t-dodecyl mercaptan and the ASTM heat distortion temperatures was each determined under a 66 p.s.i. load.

A typical emulsion recipe is as follows:

| | Parts |
|---|---|
| Total monomer | 100 |
| Distilled water | 167 |
| GAFAC RE 610 [1] (emulsifier) | 1.25 |
| t-Dodecyl mercaptan | 0.62 |
| Potassium persulfate | 0.45 |

[1] Which is a mixture of R—O—(CH$_2$CH$_2$O—)$_n$PO$_3$M$_2$ and [R—O—(CH$_2$CH$_2$O—)$_n$]$_2$PO$_2$M wherein $n$ is a number of from 1 to 40, R is an alkyl or alkaryl group and preferably a nonyl phenyl group and M is hydrogen, ammonia or an alkali metal which composition is sold by the General Aniline and Film Corp.

The resulting latices were coagulated with aluminum sulfate and the coagulated polymers were washed six times with water and were then dried prior to molding. The molded polymers listed in Table I which are within the scope of this invention were all transparent and appeared to be of a uniform, homogenous composition.

TABLE I

| Monomer Ratio | | | Percent AN in Polymer | Polymerization Method | Percent Yield | ASTM Heat Distortion Temperature, °C. | Flexural Strength, p.s.i. | Shore "D" Hardness |
|---|---|---|---|---|---|---|---|---|
| AN | DiB | MA | | | | | | |
| 55 | 27 | 18 | 62.2 | 0.40 g. AIBN, Bulk at 60° C | 28 | 66 | 13,800 | 89 |
| 55 | 27 | 18 | 63.0 | 0.270 g. K$_2$S$_2$O$_8$, 0.374 g. t-DM, Emulsion at 60° C. | 79 | 71 | 17,300 | 90 |
| 64 | 27 | 9 | 72.5 | 0.270 g. K$_2$S$_2$O$_8$, 0.374 g. t-DM, Emulsion at 60° C. | 78 | 80 | 18,700 | 87 |
| 70 | -------- | 30 | 70 | 0.270 g. K$_2$S$_2$O$_8$, 0.374 g. t-DM, Emulsion at 60° C. | -------- | 60 | 21,000 | ------------ |
| 45 | -------- | 55 | -------- | 0.45 g. K$_2$S$_2$O$_8$, 0.62 g. t-DM, Emulsion at 60° C. | 100 | 61 | 12,000 | 89 |
| 45 | 30 | 25 | -------- | 0.45 g. K$_2$S$_2$O$_8$, 0.62 g. t-DM, Emulsion at 60° C. | 76.7 | 75.5 | 12,200 | 85 |
| 70 | 25 | 5 | -------- | 0.45 g. K$_2$S$_2$O$_8$, 0.62 g. t-DM, Emulsion at 60° C. | 78.2 | 100.5 | ------------ | 90 |

Example II

The procedure of Example I was followed employing the emulsion recipe:

| | Parts |
|---|---|
| Total monomer | 100 |
| Distilled water | 167 |
| Emulsifier | 1.25 |
| t-Dodecyl mercaptan | 0.62 |
| Potassium persulfate | 0.45 |

The polymerizations were carried out under nitrogen in eight ounce bottles. The total polymerization time was 18.5 hours at a temperature of 60° C. The resulting latices were coagulated with aluminum sulfate and the polymers were washed six times with water and were then dried before molding. All test bars were compression molded at 150° C. and 4000 p.s.i.g. The results of these polymerizations and physical testing are given in Table II. In Table II the term AN means acrylonitrile, 2-MP means 2-methyl-1-pentene, MA means methyl acrylate, DiB means diisobutene, MAN means metharylonitrile, EA means ethyl acrylate. The test bars of the molded polymers given in Table II were all transparent and appeared to be of a uniform, homogeneous composition.

A prior art polymer which is outside the scope of the present claims was prepared from isobutene, acrylonitrile and methyl methacrylate according to the procedure given in Example II of U.S. Patent No. 2,537,626. The polymer was washed and dried and molded in the same manner (150° C., 4000 p.s.i.) as that for the polymers above. The molded bar was found to have an ASTM heat distortion temperature of 64° C. at 66 p.s.i., a flexural strength of 11,900 p.s.i. and it was opaque, apparently composed of a non-uniform, non-homogeneous mixture of polymers.

We claim:

1. A resinous interpolymer having excellent uniformity, homogeneity and clarity in the molded form resulting from the polymerization for from about 8 to 16 hours to a conversion of at least 70% in an aqueous medium of a monomer mixture of from 45 to 70% by weight of an alpha, beta-olefinically unsaturated mononitrile having from 3 to 5 carbon atoms, from 20 to 40% by weight of a 2-alkyl-1-olefin hydrocarbon having from 6 to 12 carbon atoms and from 5 to 25% by weight of a lower acrylic ester containing from 4 to 6 carbon atoms in the presence of from 0.1 to 5% by weight based on the combined weights of monomers of a free radical initiator.

2. The interpolymer of claim 1 wherein the alpha, beta-olefinically unsaturated mononitrile is acrylonitrile.

3. The interpolymer of claim 2 wherein the 2-alkyl-1-olefin is alpha-diisobutene.

4. The interpolymer of claim 3 wherein the lower acrylic ester is methyl acrylate.

5. The process comprising interpolymerizing for from about 8 to 16 hours in an aqueous medium a monomer mixture of from 45 to 70% by weight of an alpha, beta-olefinically unsaturated nitrile having from 3 to 5 carbon atoms, from 20 to 40% by weight of a 2-alkyl-1-olefin hydrocarbon having from 6 to 12 carbon atoms and from 5 to 25% by weight of a lower acrylic ester containing from 4 to 6 carbon atoms at a temperature of from 30 to 80° C. in the presence of from 0.1 to 5% by weight based on the combined weight of monomers of a free radical initiator said aqueous medium being present in at least about 75% by weight based on the weight of monomers.

6. The process of claim 5 carried out in the substantial absence of molecular oxygen.

TABLE II

| Monomer Ratio | Percent Yield | ASTM Heat Distortion Temperature, °C. | Flexural Strength, p.s.i. | Shore "D" Hardness |
|---|---|---|---|---|
| 55AN/27 2-MP/18MA | 82.1 | 73.5 | 14,300 | 89 |
| 55AN/27DiB/18EA | 78.6 | 78.5 | 9,100 | 89 |
| 55MAN/27DiB/18MA | 64.7 | 96.0 | 13,200 | 89 |

References Cited

UNITED STATES PATENTS 2,537,626   1/1951   Eberly et al. _____ 260—80.5 X
2,833,746   5/1958   Haefner _____ 260—80.5 X JOSEPH L. SCHOFER, *Primary Examiner.*

W. HOOVER, *Assistant Examiner.*